United States Patent [19]

Yamaguchi

[11] Patent Number: 5,409,261
[45] Date of Patent: Apr. 25, 1995

[54] TILT STEERING SYSTEM

[75] Inventor: Mikio Yamaguchi, Takasaki, Japan

[73] Assignee: NSK Ltd., Tokyo, Japan

[21] Appl. No.: 97,179

[22] Filed: Jul. 27, 1993

[30] Foreign Application Priority Data

Aug. 6, 1992 [JP] Japan .................. 4-060593 U

[51] Int. Cl.⁶ ............................. B62D 1/18
[52] U.S. Cl. ............................ 280/775; 74/493
[58] Field of Search ............ 280/775, 777; 74/492, 74/493

[56] References Cited

U.S. PATENT DOCUMENTS 4,594,909  6/1986  Yamaguchi ............ 280/775
4,949,992  8/1990  Abramczyk ........... 280/777

FOREIGN PATENT DOCUMENTS 61-199472  12/1986  Japan .
62-157863   7/1987  Japan .
 3-67778    3/1991  Japan .
 3-121176  12/1991  Japan .

Primary Examiner—Kenneth R. Rice
Attorney, Agent, or Firm—Shapiro and Shapiro

[57] ABSTRACT

In a tilt steering system, rockable teeth engage with or disengage from fixed teeth as a tilt lever is rotated. At the same time, a tilt bolt and a tilt nut are tightened or loosened. When the teeth engage each other, the tilt bolt and the tilt nut are tightened so that a fixed bracket is pressed against both sides of a vertically shifting bracket.

15 Claims, 9 Drawing Sheets

TILT STEERING SYSTEM

BACKGROUND OF THE INVENTION

1. Field of the Invention

The present invention relates to a tilt steering system, more specifically, to improvement of a component for rockably supporting a steering column which constitutes a steering system for automobiles with respect to a car body, thereby ensuring fixation of the steering column as well as improving rigidity felt by the driver.

2. Related Background Art

As an adjuster unit for adjusting height of a steering wheel, what are called tilt steering systems which can change height of the steering wheel according to the constitution or the driving posture of the driver have been disclosed in, for example, Japanese Patent Laid-Open Nos. 62-157863 and 3-67778, Japanese Utility Model Laid-Open Nos. 61-199472 and 3-121176.

Figure 11:
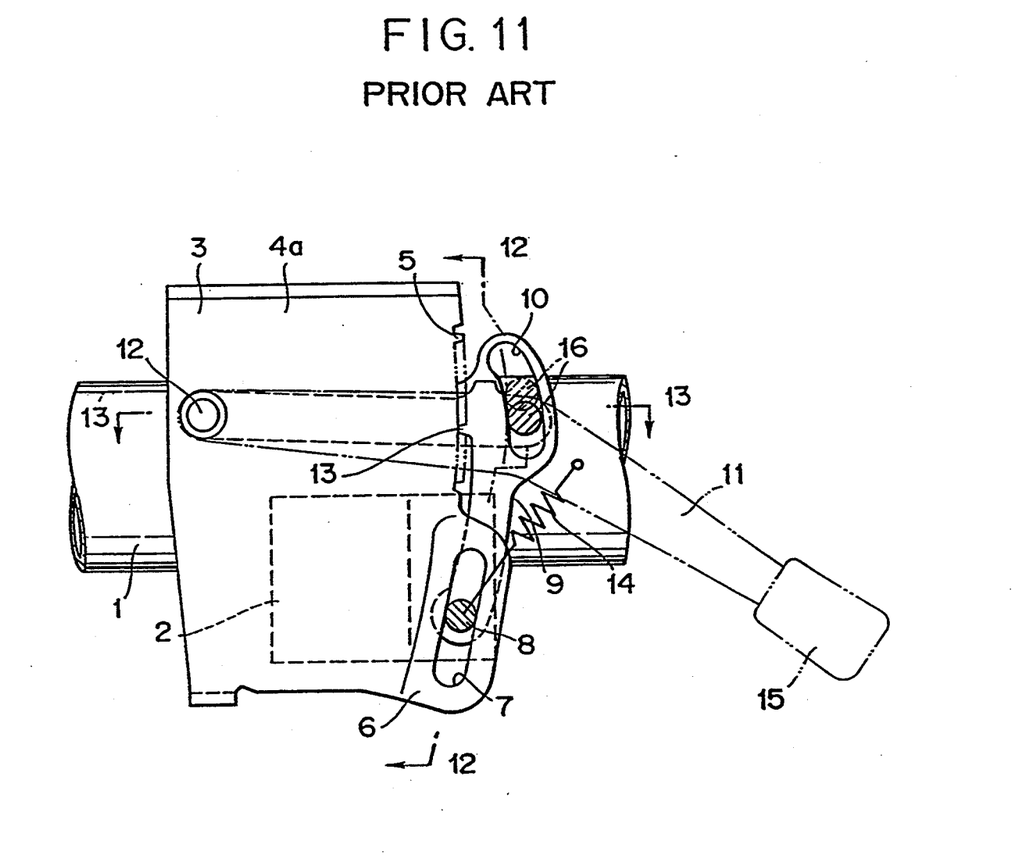
FIG. 11 is a side view showing the major portions of an example of a conventional construction in the state of fixation, with the tilt lever being removed.
Figure 12:
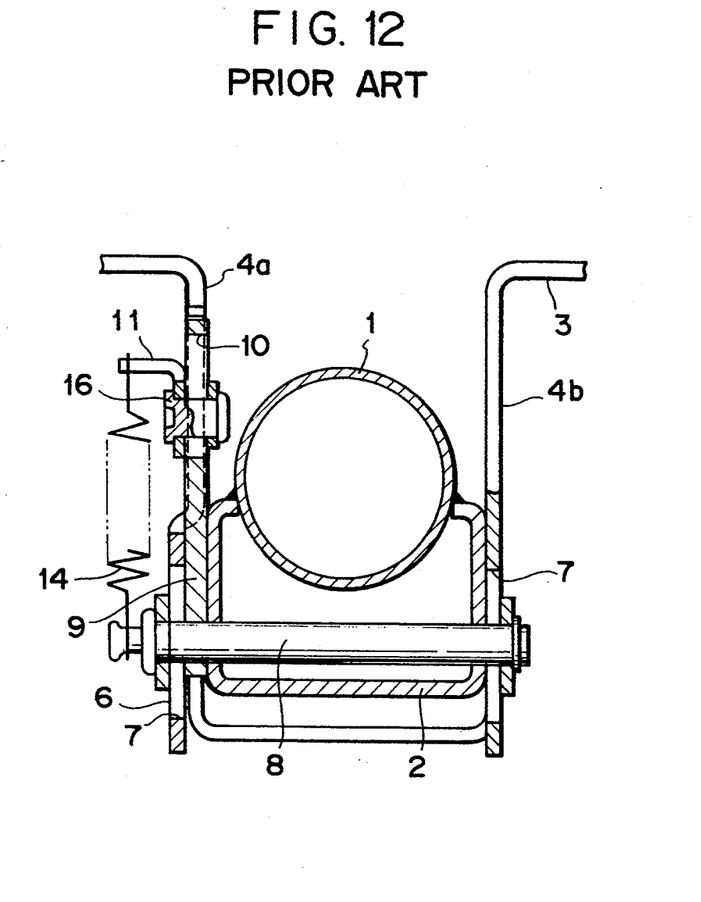
FIG. 12 is a cross-sectional view along 12—12 in FIG. 11.
Figure 13:
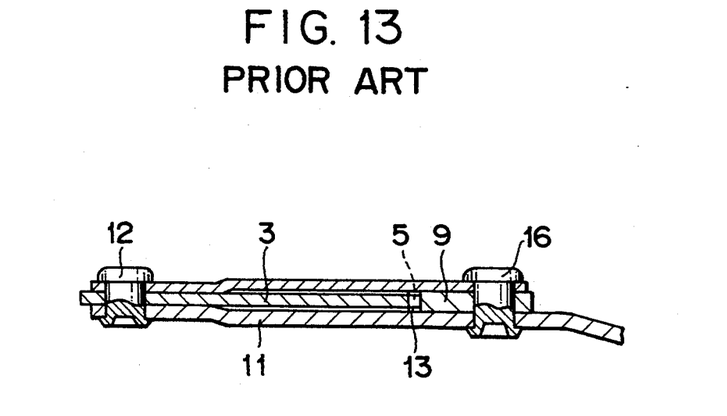
FIG. 13 is a cross-sectional view along 13—13 in FIG. 11.

FIGS. 11 to 14 show the tilt steering system disclosed in said Japanese Patent Laid-Open No. 3-67778. FIG. 11 is a side view thereof, wherein left side is the front side of the car and right side is the rear side of the car. FIG. 12 is a cross-sectional view of the system cut along 12—12 in FIG. 11. FIG. 13 is a cross-sectional view showing part of the system taken along 13—13 in FIG. 11. In this tilt steering system, a steering wheel (not shown: hereinafter, components not indicated by reference numerals are not shown in the figures) is fixed to the rear end of a steering shaft. The steering shaft is rotatably held in a steering column 1, whose front end portion is rockably set around a cross-shaft (first cross-shaft). An up and down or vertically shifting bracket 2, which is a metal plate folded into a U-shape is fixed by welding to the lower part of the middle portion of said steering column 1. A fixed bracket 3, to which the vertically shifting bracket 2 is abutted, is fixed to the car body.

The fixed bracket 3 consists of a pair of vertical panels 4a and 4b. Teeth 5 are formed on the rear edge of the upper part of the vertical panel 4a, along a circular arc which is convex toward the rear side and whose center coincides with the above-mentioned cross-shaft. An engaging stopper portion 6 is formed in the rear side of the lower part of the vertical panel 4a. Vertically elongated guide holes 7 are formed in the engaging stopper portion 6 and in the rear side of the lower part of the other vertical panel 4b corresponding to the engaging stopper portion. The guide holes 7 are formed along a circular arc whose center coincides with the cross-shaft. A second cross-shaft 8 penetrating the side walls of said vertically shifting bracket 2 has its ends idly engaged in respective guide holes 7. An engaging stopper lever or latch lever 9 located between the outer side of the vertically shifting bracket 2 and the inner side of the engaging stopper portion 6 pivots on one end of the second cross-shaft 8. A cam hole 10 is formed in the other side of the engaging latch lever 9. The cam hole 10 is not formed along a circular arc whose center coincides with a third cross-shaft 12, on which the front end of a tilt lever 11 pivots. Accordingly, the distance from the third cross-shaft 12 to the cam hole 10 gradually varies with respect to the positions along the rim of the cam hole 10. Further, rockable teeth 13 are formed on the front edge of the upper part of the latch lever 9 constructed as described above, such that the rockable teeth 13 can be engaged with and disengaged from the fixed teeth 5.

The third cross-shaft 12 is provided in the front side of the middle part of the vertical panel 4a, which is one of the vertical panels constituting the fixed bracket 3. As mentioned above, the front end of the tilt lever 11 pivots on the third cross-shaft 12. An engaging pin 16 projected from the middle portion of the inner side of the tilt lever 11 is loosely engaged in the cam hole 10. If the tilt lever 11 is rotated counter-clockwise (see FIG. 11) around the third cross-shaft 12 and the engaging pin 16 is shifted upward along the cam hole 10, the latch lever 9 is rotated clockwise around the second cross-shaft 8 so that the rockable teeth 13 formed on the front edge of the upper part of the latch lever 9 are separated from the fixed teeth 5 formed on the rear edge of the vertical panel 4a of the fixed bracket 3.

On the other hand, if the tilt lever 11 is rotated clockwise (in FIG. 11) around the third cross-shaft 12 and the engaging pin 16 is shifted downward along the cam hole 10, the latch lever 9 is rotated counter-clockwise around the second cross-shaft 8 so that the rockable teeth 13 formed on the front edge of the upper part of the latch lever engage the fixed teeth 5 formed on the rear edge of the vertical panel 4a of the fixed bracket 3. An extension spring 14 is connected between one end of the second cross-shaft 8 and the middle portion of the tilt lever 11 in order to give a clockwise bias (see FIG. 11) to the tilt lever 11, whereby the fixed teeth 5 and the rockable teeth 13 always engage each other as long so no external force is applied.

Figure 14:
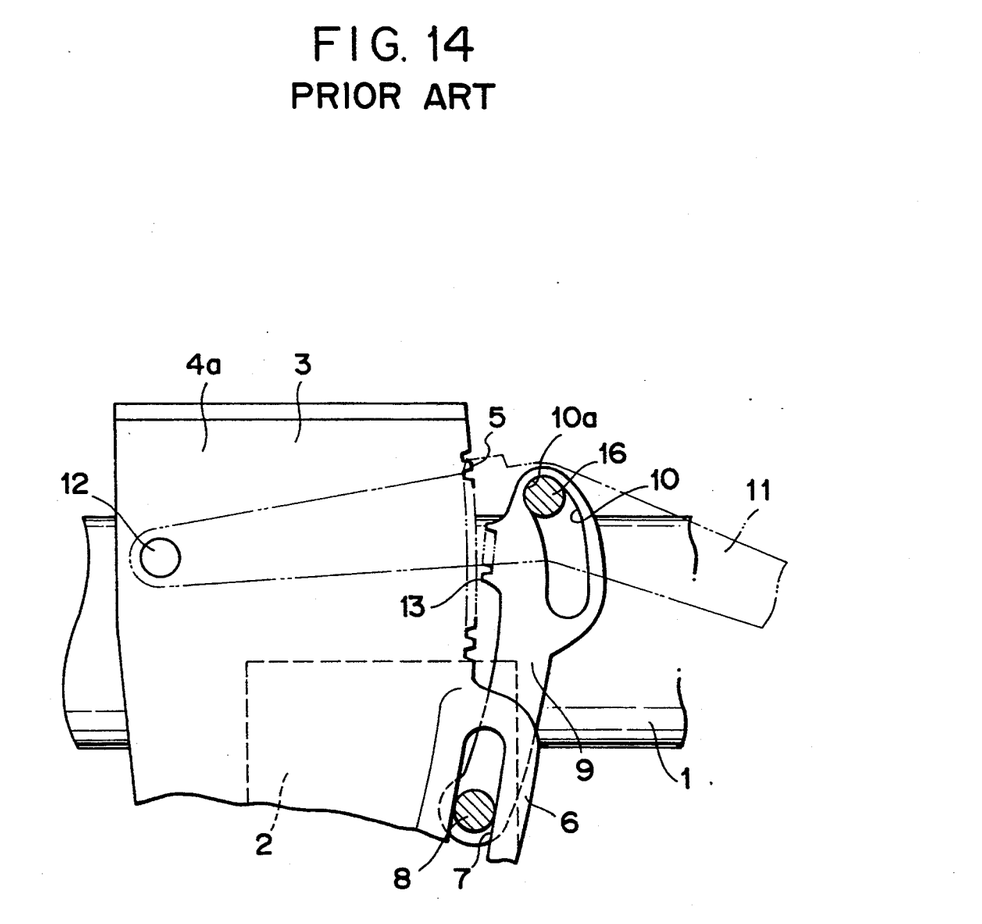
FIG. 14 is a side view showing the major portions of the conventional construction shown in FIG. 11 in the unfixed state, with the tilt lever being removed.

In the conventional tilt steering system constructed as described above, height of the steering wheel is adjusted according to the constitution or the like of the driver as follows. By lifting up a grip portion 15 provided at the peripheral end of the tilt lever 11, the tilt lever 11 is rotated counter-clockwise (see FIG. 11), against the force given by the extension spring 14, around the third cross-shaft 12. At that time, as shown in FIG. 14, the engaging pin 16 projected from the middle portion of the inner side of the tilt lever 11 is shifted up to the upper end portion 10a of the cam hole 10 formed in the upper end of the engaging stopper lever 9.

As a result, the rockable teeth 13 formed on the front edge of the upper part of said latch lever 9 retreat from the fixed teeth 5 formed on the rear edge of the vertical panel 4a of the fixed bracket 3. Thus, the rockable teeth 13 disengage from the fixed teeth 5 so that the vertically shifting bracket 2 fixed to the steering column 1 can be shifted up/down with respect to the fixed bracket 3 fixed to the car body.

Subsequently, the steering wheel in the above-mentioned state is adjusted to an arbitrary height in a range where the ends of the second cross-shaft can move in the pair of respective guide holes 7. As the steering wheel is shifted up and down, the steering column 1 is rocked around said first cross-shaft. At the same time, the vertically shifting bracket 2 fixed to the lower part of the middle portion of the steering column 1 is shifted up and down between the pair of vertical panels 4a and 4b constituting the fixed bracket 3, and the engaging stopper lever 9 whose bottom end pivots on the second cross-shaft penetrating the vertically shifting bracket 2 is also shifted up and down.

After adjusting the height of the steering wheel, the tilt lever 11 is rotated clockwise (see FIG. 11) around the third cross-shaft 12 so that the engaging pin 16 projected from the inner side of the tilt lever 11 is shifted downward along the cam hole 10 formed in the peripheral end of the latch lever 9. As a result, the rockable teeth 13 formed on the front edge of the upper part of the latch lever 9 approach the fixed teeth 5 formed on the rear edge of the vertical panel 4a of the fixed bracket 3. Thus, the rockable teeth 13 engage the fixed teeth 5, and the vertically shifting bracket 2 fixed to the steering column 1 cannot be shifted up or down with respect to the fixed bracket 3 fixed to the car body, thereby holding said steering wheel at adjusted height.

In the conventional construction shown in FIGS. 11 to 14, though it is possible to adjust height of the steering wheel without increasing the amount of operation of the tilt lever, rigidity of the steering wheel whose height is adjusted is not sufficient. More particularly, the vertically shifting bracket 2 fixed to the steering column is fixed to the fixed bracket 3 fixed to the car body only by engagement of the fixed teeth 5 and the rockable teeth 13, wherein the vertical panels 4a and 4b of the fixed bracket 3 are not pressed against the side surfaces of the vertically shifting bracket 2.

Therefore, even when the steering wheel whose height is adjusted is fixed, the vertically shifting bracket 2 tends to rattle in the fixed bracket 3, whereby the driver who handles the steering wheel feels undesirable uncertainty. The construction disclosed in the above-mentioned the Japanese Patent Laid-Open No. 62-157863 also has the same shortcoming.

In contrast, the Japanese Utility Model Laid-Open No. 61-199472 discloses a construction in which the steering wheel whose height is adjusted is fixed by pressing the vertical panels of the fixed bracket against both sides of the vertically shifting bracket. In this construction, however, the steering wheel whose height is adjusted is fixed only by friction between both sides of the vertically shifting bracket and respective inner side of the vertical panels of the fixed bracket, Thus, a larger amount of operation of the tilt lever is required to obtain sufficient rigidity. This is undesirable from the standpoint of usability. Also, because fixation is performed only with friction, when strong force is given to the steering wheel, as, for example, in the case of a car crash, the steering wheel can deviate from its set position. In order to ensure the effect of an air bag device installed in the steering wheel for protecting the driver in a car crash, such deviation should be avoided.

To solve the above problem, in construction disclosed in the Japanese Utility Model Laid-Open No. 3-121176, not only do the vertical panels of the fixed bracket pressure-weld both sides of the vertically shifting bracket, but two sets of working teeth engage with each other to fix the steering wheel whose height is adjusted.

In the above-mentioned constitution, however, the upper end of a rockable arm pivots on the fixed bracket, and after tightening up a tilt bolt in a tilt nut, working teeth formed in said rockable arm engage with working teeth formed in the vertically shifting bracket against a spring force. Accordingly, problems arise in that, for example, the rockable arm becomes longer, and engagement of the two sets of working teeth becomes insecure.

SUMMARY OF THE INVENTION

The tilt steering system of the present invention was invented in view of the problems explained above.

The tilt steering system of the present invention improves rigidity of the fixed steering wheel whose height is adjusted without increasing the amount of operation of the tilt lever in adjusting the height of the steering wheel.

The tilt steering system of the present invention may comprise a steering column which rotatably holds a steering shaft to which a steering wheel is fixed; a pivot portion in which the front end of the steering column pivots on a first axis; a vertically shifting bracket fixed to the middle portion of the steering column; a fixed bracket fixed to the car body and embracing the vertically shifting bracket; teeth formed in a portion of the fixed bracket along a circular arc whose center coincides with the first axis pair of slits formed on both sides of the fixed bracket along a circular arc whose center coincides with the first axis; through-holes or notches formed at positions (of the vertically shifting bracket) corresponding to the slits; a bolt which penetrates the through-holes or notches, and said slits, and projects one end through one of the slits; a nut having an internal thread in which the end portion of the bolt is tightened; a tilt lever whose end is fixedly connected to the nut or to the head portion of the bolt; a latch lever pivoting on a second axis provided in the side of the steering column; teeth formed on the front edge of the upper part of the latch lever which can engage with and disengage from said fixed teeth; a cam which is formed in one of the tilt lever and the latch lever and whose distance from the bolt gradually varies along the the cam face; and a pressure pin which is supported by the other member of the tilt lever and the latch lever, and which engages the cam in order to press the teeth of the latch lever against the teeth of the fixed bracket.

One of the pivotal end of the tilt bolt and the tilt nut (the one to which the end of the tilt lever is not fixed) is engaged non-rotatably in the slit. When the tilt lever is rotated to fix the steering column, the fixed bracket is strongly pressed against both sides of the vertically shifting bracket by means of the tilt nut and the end of the tilt bolt. At the same time, the pressure pin engages the cam so as to press the teeth of the latch member against the fixed teeth of dimensions of respective components are determined so as to execute the above-mentioned functions.

In the above-mentioned construction of the tilt steering system of the present invention, when height of the steering wheel is adjusted according to constitution of the driver, and so on, the tilt lever is rotated around the bolt so that the pressure pin projected from the side of the tilt lever (or the latch lever) is shifted to one end of the cam face formed in the peripheral end of the latch lever (or the tilt lever). At the same time, the bolt or the nut is rotated to be loosened from the other.

As a result, the teeth formed on the peripheral edge of the latch lever retreat and disengage from the teeth formed in the fixed bracket. At the same time, the distance between the head portion of the bolt and the nut becomes greater to release the sides of the vertically shifting bracket from pressure given by the fixed bracket. As a result, the vertically shifting bracket fixed to the steering column can be shifted up and down with respect to the fixed bracket fixed to the car body. Subsequently, height of the steering wheel is arbitrarily adjusted.

After determining height of the steering wheel, the tilt lever is rotated reversely, i.e. in the opposite direction, around the tilt bolt. Thus, the pressure pin projected from the side of the tilt lever (or the latch lever)

is shifted to the other end of the cam face formed in the latch lever (or the tilt lever).

As a result, the teeth formed on the front edge of the upper part of the latch lever approach and engage the teeth formed in the fixed bracket. At the same time, the distance between the head portion of the tilt bolt and the tilt nut becomes smaller so that the fixed bracket is strongly pressed against the sides of the vertically shifting bracket. Thus, the vertically shifting bracket fixed to the steering column cannot be shifted up and down with respect to the fixed bracket fixed to the car body.

Since fixation of the vertically shifting bracket is executed not only by engagement between the teeth of the fixed bracket and the teeth of the latch member but also with friction, even if vertical strong force is given to the steering wheel after fixation, the steering wheel is not deviated, nor minutely rattles.

DESCRIPTION OF THE PREFERRED EMBODIMENTS

Now the preferred embodiments of the present invention will be described in detail with respect to the drawings.

FIGS. 1 to 5 show a first embodiment of the present invention. A steering shaft 17 is rotatably supported in a steering column 1, and a steering wheel (not shown) is fixed to the rear end (right side in FIG. 1) of the steering shaft 17. The front end of the steering column 1 pivots on a horizontally provided first cross-shaft 18 so as to be rockable with respect to the car body.

Figure 1:
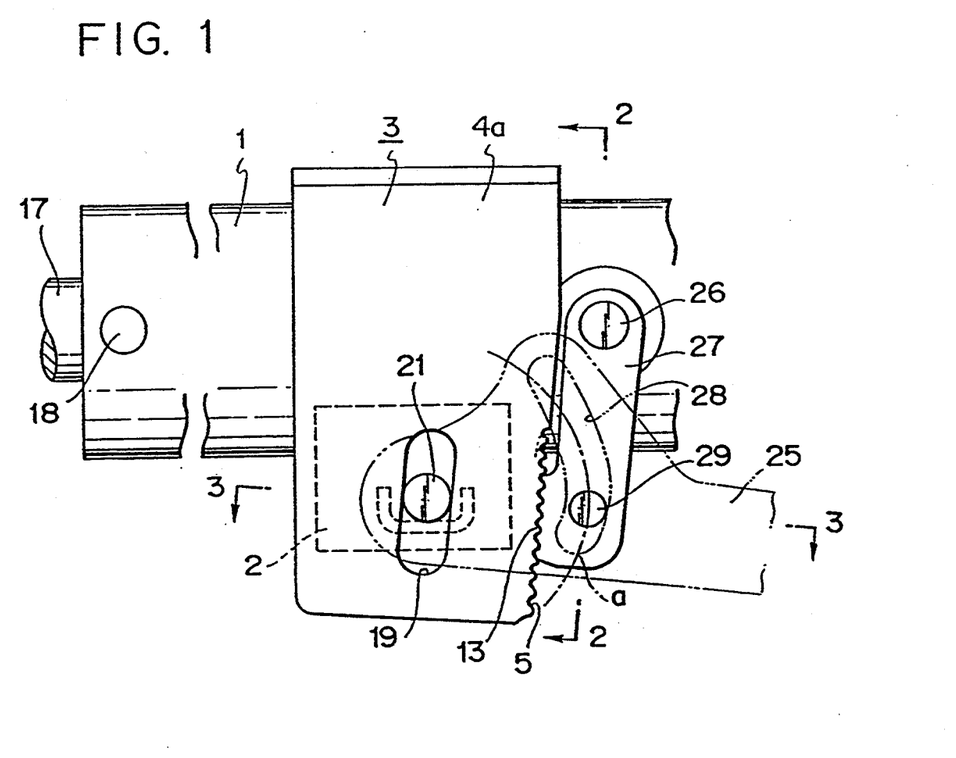
FIG. 1 is a side view of major portions of a first embodiment of the present invention in the state of fixation, with the tilt lever being removed.
Figure 2:
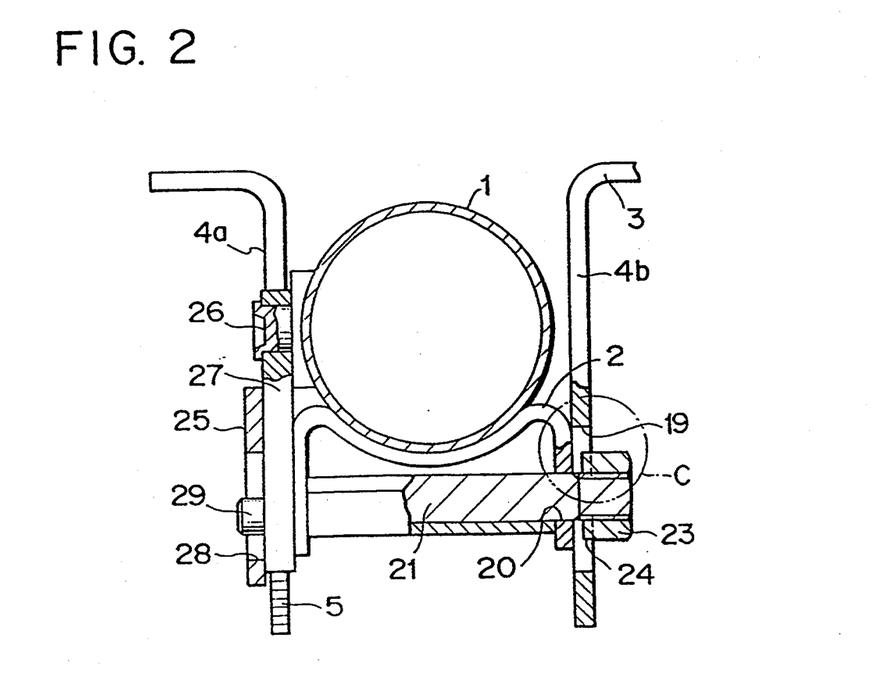
FIG. 2 is a cross-sectional view along 2—2 in FIG. 1.
Figure 3:
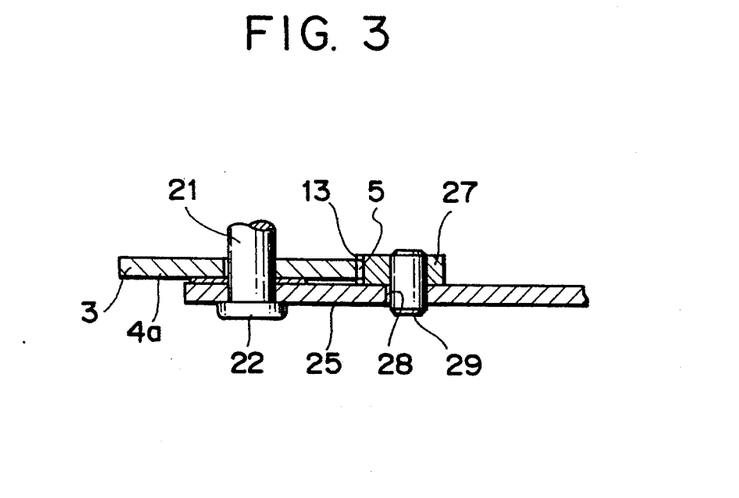
FIG. 3 is a cross-sectional view along 3—3 in FIG. 1.

A vertically or up and down shifting bracket 2 is fixed to the middle portion of the steering column 1. A fixed bracket 3 having a pair of vertical panels 4a and 4b respectively provided on both sides is fixed to the car body such that the vertical panels 4a and 4b are juxtaposed with the vertically shifting bracket 2 with the vertically shifting bracket 2 situated between the vertical panels 4a and 4b.

Teeth 5 are formed on the rear edge of one of said vertical panels, 4a, in the form shown of the fixed bracket 3. The teeth are formed along a circular arc whose center coincides with corresponding axis of said first cross-shaft 18. Slots 19 are formed in the lower portions of said pair of vertical panels 4a and 4b, with each slot being formed along a circular arc whose center coinsides with the axis of the first cross-shaft 18. Further, circular through-holes 20 are formed in portions of the vertically shifting bracket 2 corresponding to respective slots 19.

A tilt bolt 21 penetrates through these through-holes 20 and the slots 19. The tilt bolt 21 has a head 22 whose diameter is greater than the width of the slots 19. The other end of the tilt bolt 21 is projected through one slot 19 and engages a tilt nut 23. A projection 24 for engaging the slot 19 is formed in inner side of the tilt nut 23 so that the tilt nut 23 is shifted along the slot 19 but is not rotated with respect to the slot 19 (that is, the tilt nut 23 is not rotated together with the tilt bolt 21).

The pivotal end of a tilt lever 25 is fixedly connected to the head portion of the tilt bolt 21 so that the tilt bolt 21 is rotated with the tilt lever 25. Further, a second cross-shaft 26 is provided in the sides of the steering column 1, on which the pivotal end of a latch lever 27 pivots. Teeth 13 are formed on the front edge of the peripheral end portion of the latch lever 27 so that they can be engaged with and disengaged from the teeth 5 of the fixed bracket 3.

Furthermore, a slot 28 is formed in the tilt lever 25 whose inner rim serves as a cam, and a pressure pin 29 supported by the side of the latch lever 27 is loosely engaged in the slot 28. The slot 28 is formed along a circular arc different from the circular arc a whose center coincides with the axis of the tilt bolt 21. Accordingly, the distance from the tilt bolt 21 becomes greater from the lower end to the upper end of the slot 28.

When the tilt lever 25 is rotated to fix the steering column, the tilt nut 23 and the inner side of the pivotal end of the tilt lever 25 which is fixedly connected to the head portion of the tilt bolt 21 strongly press against said pair of vertical panels 4a and 4b constituting the fixed bracket 3. Thus, the inner sides of the vertical panels 4a and 4b are strongly pressed against respective sides of the vertically shifting bracket 2. At the same time, the teeth 13 of the latch lever are pressed against the teeth 5 of the fixed bracket 3 by means of engagement of the pressure pin 29 with the inner face of the slot 28. Dimensions of the above-mentioned constituents are determined so as to execute the above-mentioned functions.

In the tilt steering system constituted as described above, height of the steering wheel is adjusted according to constitution of the driver, and so on, as follows. The tilt lever 25 is rotated clockwise from its position shown in FIG. 1 to its position shown in FIG. 4 so that the pressure pin projected from the side surface of the latch lever 27 is shifted to the upper end of the slot 28 formed in the tilt lever. At the same time, the tilt bolt 21 is rotated and loosened from the tilt nut 23.

The distance between the pressure pin 29 and the tilt bolt 21 becomes greater as the pressure pin 29 is shifted toward the upper end of the slit 28. As a result, the latch lever 27 is rotated counter-clockwise from its position shown in FIG. 1 to its position shown in FIG. 4. Thus, the teeth 13 formed on the latch lever 27 retreat and disengage from the teeth 5 formed on the fixed bracket 3.

Figure 4:
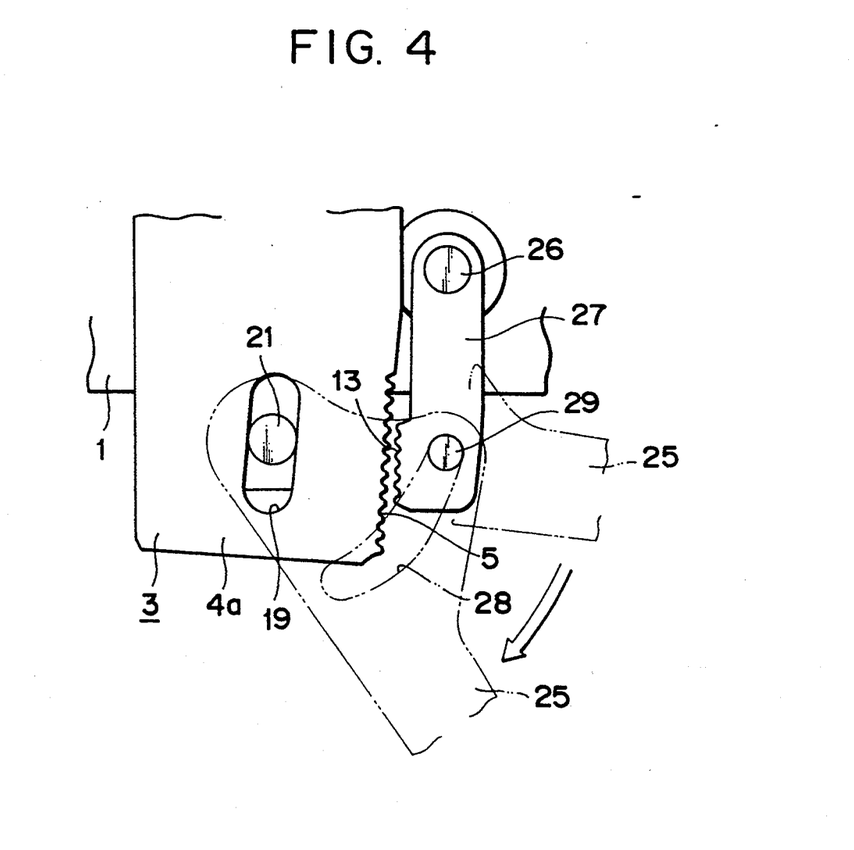
FIG. 4 is a side view of major portions of the first embodiment of the present invention in the unfixed state, with the tilt lever being removed.

At the same time, the distance between the inner side of the tilt lever 25 fixed to the head portion of the tilt bolt 21 and the tilt nut 23 becomes greater so that the pair of vertical panels 4a and 4b constituting the fixed bracket 3 is released from force by which the inner sides of the vertical panels 4a and 4b are pressed against both sides of the vertically shifting bracket 2. Thus, the vertically shifting bracket 2 fixed to the steering column 1 can be shifted up and down with respect to the fixed bracket 3 fixed to the car body. Subsequently, height of the steering wheel is arbitrarily adjusted in this state.

After adjusting height of the steering wheel, the tilt lever 25 is rotated counter-clockwise (that is, reversely with respect to the previous operation) from its position shown in FIG. 4 to its position shown in FIG. 1 so that the pressure pin 29 projected from the side of the engaging stopper lever 27 is shifted to the lower end of the slot 28.

As the pressure pin 29 is shifted to the lower end of the slot 28, the distance between the pressure pin 29 and the tilt bolt 21 becomes smaller. As a result, the teeth 13 formed on the edge of the peripheral end of the latch lever 27 approach the teeth 5 formed in the fixed bracket 3 and engage therewith. At the same time, the distance between the inner side of the pivotal end of the tilt lever 25 fixedly connected to the head portion of the tilt bolt 21 and the tilt nut 23 becomes smaller so that the inner surfaces of the pair of vertical panels 4a and 4b constituting the fixed bracket 3 are strongly pressed against both sides of the vertically shifting bracket 2. Thus, the vertically shifting bracket 2 fixed to the steering column 1 cannot be shifted up or down with respect to the fixed bracket 3 fixed to the car body.

Since the vertically shifting bracket 2 is fixed not only by engagement of the fixed teeth 5 and the rockable teeth 13, but also with friction between the vertically shifting bracket 2 and the vertical panels 4a and 4b of the fixed bracket 3, even when strong force is given horizontally and vertically to the steering wheel after fixation, the steering wheel is not deviated nor minutely rattles.

Figure 5:
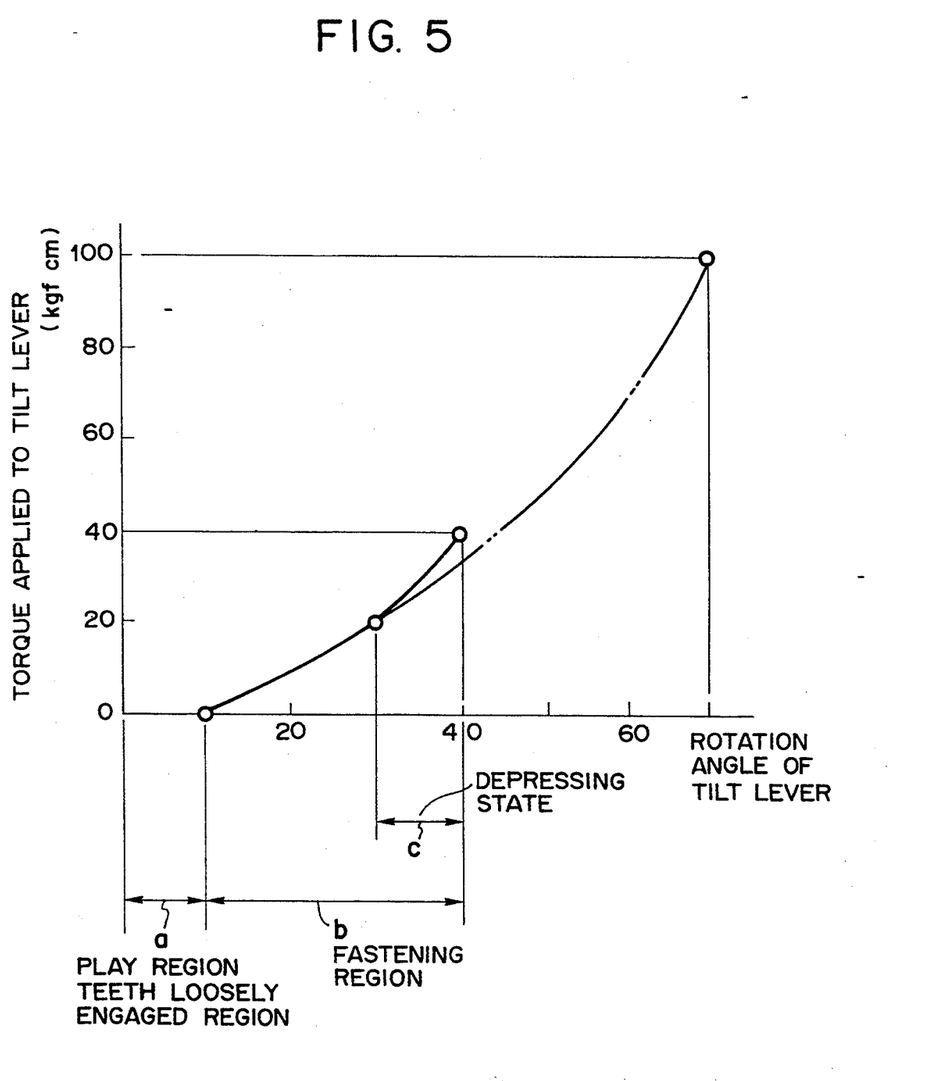
FIG. 5 is a diagram showing the relation between the angle of rotation and operating torque of the tilt lever.

Referring to the graph shown in FIG. 5, as the tilt lever 25 is rotated from the loosened state in FIG. 4 to the tightened state in FIG. 1, the tilt lever 25 passes through a play region a (where the fixed and rockable teeth loosely engage with each other) of the tilt bolt 21 and the tilt nut 23. Then, when the tilt lever 25 comes to a fastening region b, the tilt bolt 21 and the tilt nut 23 begin to press the inner surfaces of the pair of vertical panels 4a and 4b against both sides of the vertically shifting bracket 2. Subsequently, when the tilt lever 25 reaches a pressing region c which overlaps with the final phase of the fastening region b, the rockable teeth 13 are pressed against the fixed teeth 5.

In FIG. 5, the abscissa and ordinate are for the angle of rotation of the tilt lever and torque applied to the tilt lever, respectively. According to the calculation by the inventor, in the constitution of the present invention shown in FIGS. 1 to 4, the steering column can be fixed with sufficient holding power and rigidity when the tilt lever is rotated by 40° or more with torque of 40 kgf·cm. On the other hand, in order to obtain equally sufficient holding power and rigidity only from tightening force of the tilt bolt and the tilt nut, as described in the Japanese Utility Model Laid-Open No. 61-199472, the tilt lever has to be rotated by about 70° with torque of 100 kgf·cm as indicated by the chain line in FIG. 5.

Figure 6:
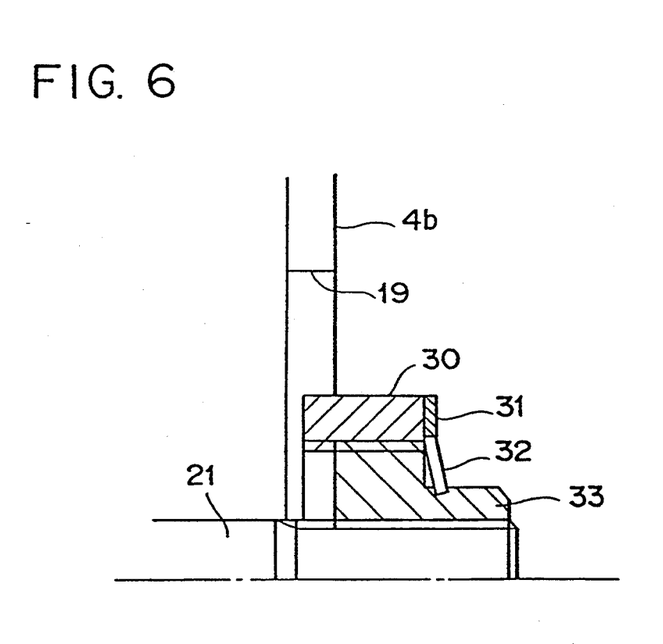
FIG. 6 is a cross-sectional view of a second embodiment of the present invention, wherein portions corresponding to those enclosed by a circle C in FIG. 2 are shown.

FIG. 6 shows a second embodiment of the present invention. In this embodiment, the relation of the position of the tilt nut 23 to that of the tilt bolt 21 can be adjusted without rotating the tilt bolt 21. Therefore timing at which the rockable teeth 13 come to engage the fixed teeth 5 can be synchronized with timing at which the tilt nut 23 and the inner surface of the pivotal end of the tilt lever 25 start to press the inner sides of the pair of the vertical panels 4a and 4b against both sides of the vertically shifting bracket 2, while the tilt lever 25 remains in the optimal position (see FIGS. 1 to 4).

More specifically, a sleeve 30 is set in the slot 19 formed in the vertical panel 4b, whereby the sleeve can move only along the slot 19. An internal serration formed on the inner peripheral surface of the sleeve 30 engages with an external serration formed on the outer peripheral surface of a tilt nut 33. A plurality of claws 32 are formed along the rim of the inner peripheral surface of a ring 31 for preventing the tilt nut from coming off. The ring 31 is in contact with the outer surface of the sleeve 30. The plurality of claws 32 bite into the outer peripheral surface of the tilt nut 33 in order to prevent the tilt nut 33 from coming off from the sleeve 30 when the tilt bolt 21 and the tilt nut 33 are tightened.

In the above construction, the position of the tilt nut 33 in the direction of the axis of the tilt bolt 21 can be adjusted with respect to the tilt bolt 21 without rotating the tilt bolt 21. That is, synchronization can be realized while the tilt lever 25 remains at the optimal position.

Figure 7:
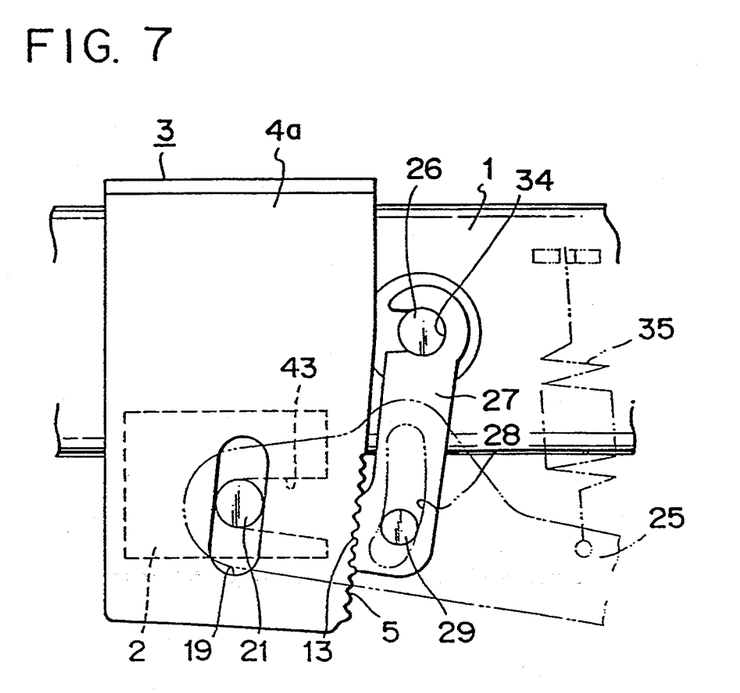
FIG. 7 is a side view showing the major portions of a third embodiment of the present invention, with the tilt lever being removed.

FIG. 7 shows a third embodiment of the present invention. In this embodiment, the vertically shifting bracket 2 has notches 43 which are open at the rear side. The tilt bolt 21 penetrates through these notches 43. Further, a notch 34 which is open at the front side is formed in the peripheral end of the latch lever 27. The second cross-shaft penetrates through the notch 34.

In the above construction, the steering column 1 is able to shift forward when a car crash happens so that the driver who is thrown to the steering wheel does not receive large impact, thereby realizing what is called a collapsible steering column system. Incidentally, as extension spring 35 shown in FIG. 7 gives a force to shift the tilt lever 25 so that the tilt lever 25 fixes the position of the steering wheel. Therefore, the height of the steering wheel is fixed unless the tilt lever 25 is operated to adjust height of the steering wheel.

Figure 8:
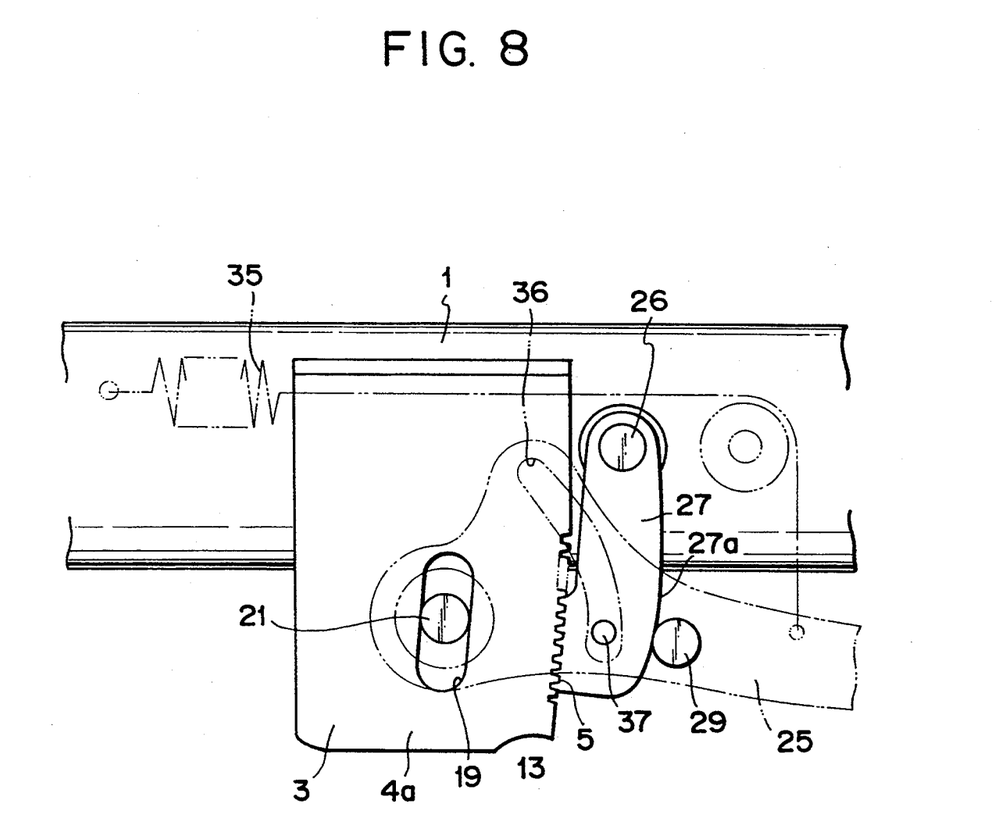
FIG. 8 is a side view showing the major portions of a fourth embodiment of the present invention, with the tilt lever being removed.

FIG. 8 shows a fourth embodiment of the present invention. In this embodiment, the pressure pin 29 is fixedly provided in the middle portion of the side of the tilt lever 25, so what the pressure pin 29 slides while in contact with the rear edge 27a serving as a cam face of the latch lever 27. A slot 36 formed in the tilt lever 25 and an engaging pin 37 provided on the latch lever 27 are provided in order to ensure disengagement of the rockable teeth 13 from the fixed teeth 5 when the tilt lever 25 is rotated against force given by the extension spring 35.

Figure 9:
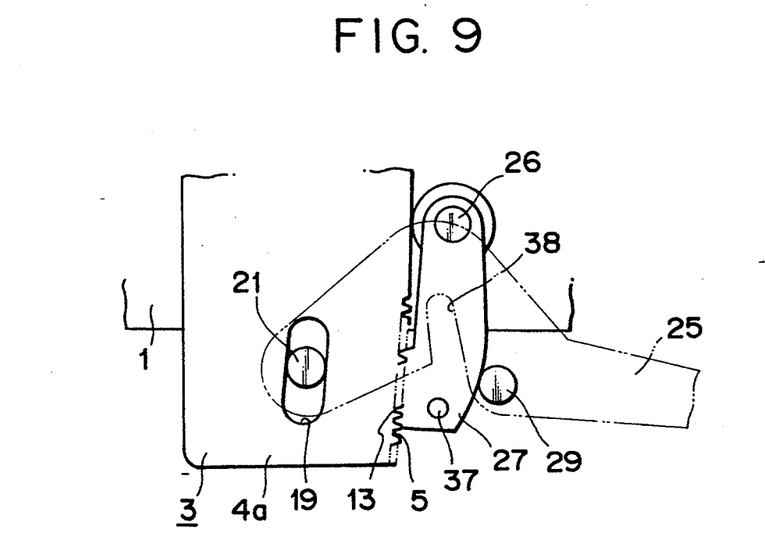
FIG. 9 is a side view showing the major portions of a fifth embodiment of the present invention, with the tilt lever being removed.

FIG. 9 shows the fifth embodiment of the present invention. In this embodiment, engagement of a notch 38 formed in the tilt lever 25 and the engaging pin 37 provided on the latch lever 27 ensures disengagement of the rockable teeth 13 from the fixed teeth 5 when the tilt lever 25 is rotated against force given by the extension spring 35 (see FIG. 8). The rest of the components and the functions are the same as the above-mentioned fourth embodiment.

Figure 10:
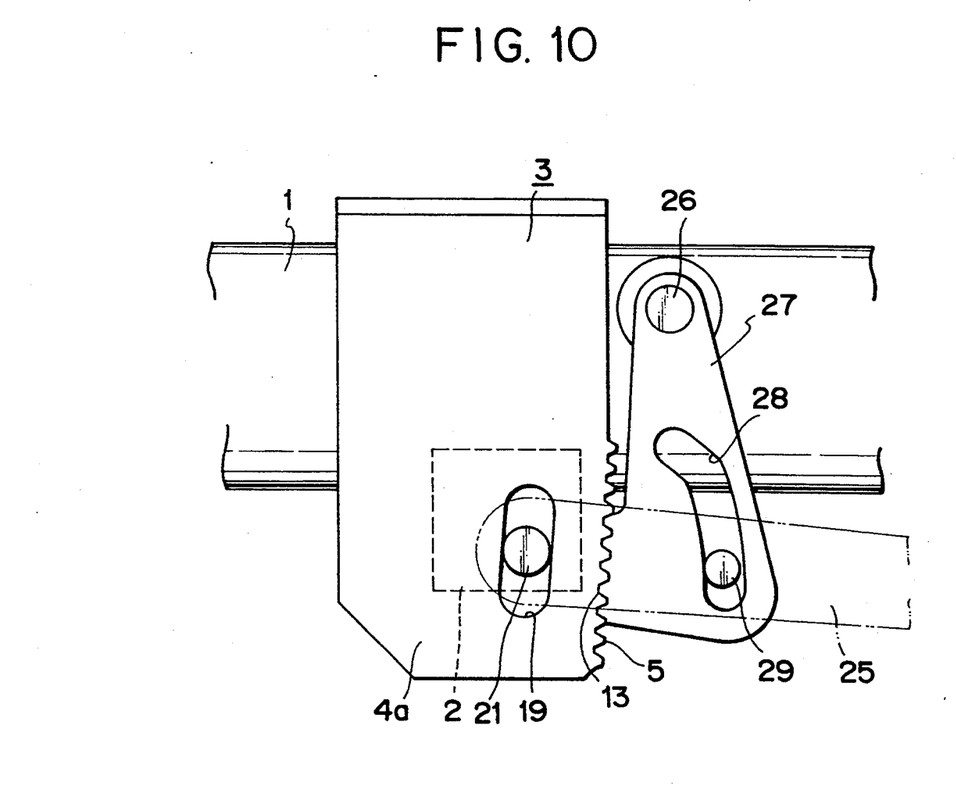
FIG. 10 is a side view showing the major portions of a sixth embodiment of the present invention, with the tilt lever being removed.

FIG. 10 shows a sixth embodiment of the present invention. In this embodiment, the pressure pin 29 is provided on the tilt lever 25, while the slot 28 is formed in the latch lever 27. When height of the steering wheel is adjusted, the tilt lever 25 is rotated counter-clockwise. The rest of the components and the functions are the same as the above-mentioned first embodiment.

Though not illustrated, the pivotal end of the tilt lever 25 may be fixed to the tilt nut 23. In this case, the head 22 of the tilt bolt 21 is non-rotatably set in the slot 19. Furthermore, a cylindrical portion serving as the tilt nut may be formed in the pivotal end of the tilt lever 25 by burring. In this case, an internal thread is formed on the inner peripheral surface of the cylindrical portion so that the end portion of the tilt bolt can engages therewith.

In the tilt steering system of the present invention, whose constitution and functions have been described above, the steering column is fixed or unfixed not only by engagement or disengagement of the teeth but also by tightening the tilt bolt and the tilt nut or loosening the tilt bolt from the tilt nut. Accordingly, even a small amount of rotation of the tilt lever is enough to ensure fixation of the steering column. Also, since the amount of projection of the tilt lever at the time of tilt adjustment is large, the tilt lever is not obstructive nor is the fixed steering wheel is deviated. As the amount of rotation of the tilt lever required to execute tilt adjustment is reduced, the driver can make a tilt adjusting operation with no discomfort. Moreover, when the steering wheel is fixed, rigidity thereof is improved and the driver who handles the steering wheel does not feel uncertainty.

What is claimed is:

1. A tilt steering system comprising:
   a steering shaft at one end of which a steering wheel is fixed;
   a steering column in which the steering shaft is rotatably held, said steering column being rotatably supported around a first axis to the vehicle body so that the steering column is vertically shiftable to adjust height of said steering wheel;
   a vertically shiftable bracket fixed to the steering column;
   a fixed bracket fixed to the vehicle body for supporting said vertically shiftable bracket and having a fixed first set of teeth thereon;
   tightening means provided in the fixed bracket for pressing the fixed bracket against said vertically shiftable bracket and fixing said vertically shiftable bracket;
   a latch lever having a second set of teeth for engaging said first set of teeth, said latch lever being supported to the steering column for rotation about a second axis between an engaging position in which said first and second sets of teeth are engaged and a disengaging position in which said first and second sets of teeth are disengaged;
   a tilt lever rotatably supported to the fixed bracket for rotation between a first position to hold the latch lever at the engaging position and a second position to hold the latch lever at the disengaging position; and
   guide means for guiding the latch lever as the tilt lever moves between said first and second positions.

2. A tilt steering system according to claim 1, wherein said guide means includes a disengagement cam face formed on the tilt lever and a cooperable cam pin formed on the latch lever such that when the tilt lever is shifted from the first position to the second position, the cam pin engages the disengagement cam face to urge the latch lever from the engaged position toward the disengaged position.

3. A tilt steering system according to claim 1, wherein said guide means includes an engagement cam face formed on the latch lever and a cooperable cam pin which is formed on the tilt lever to urge the latch lever toward the engaged position to press the second set of teeth into engagement with the first set of teeth when the tilt lever is shifted from the second position to the first position.

4. A tilt steering system according to claim 1, wherein said guide means includes an engagement cam face formed on the tilt lever and a cooperable cam pin formed on the latch lever such that the engagement cam face presses the pin to urge the latch lever toward the engaged position to press the second set of teeth into engagement with the first set of teeth when the tilt lever is shifted from the second position to the first position.

5. A tilt steering system according to claim 1, wherein said guide means includes a cam slot formed in one of the tilt lever and the latch lever and a cam pin formed on the other of the tilt lever and the latch lever, the cam slot having a cam surface which cooperates with the cam pin to urge the latch lever from the engaged position toward the disengaged position when the tilt lever is shifted from the first position to the second position.

6. A tilt steering system according to claim 5, wherein said cam slot includes another cam surface which cooperates with the cam pin to urge the latch member toward the engaged position to press the second set of teeth into engagement with the first set of teeth when the tilt lever is shifted from the second position to the first position.

7. A tilt steering system comprising:
   a steering shaft at one end of which a steering wheel is fixed;
   a steering column in which the steering shaft is rotatably held, the steering column being rotatably supported around a first axis to the vehicle body so that the steering column is vertically shiftable to adjust height of said steering wheel;
   a vertically shiftable bracket fixed to the steering column;
   a fixed bracket fixed to the vehicle body for supporting said vertically shiftable bracket and having a fixed first set of teeth thereon;
   a rotation axis member rotatably provided on the fixed bracket;
   a latch lever having a second set of teeth for engaging said first set of teeth, said latch lever being supported to the steering column for rotation about a second axis between an engaging position in which said first and second sets of teeth are engaged and a disengaging position in which said first and second sets of teeth are disengaged;
   a rotatable tilt lever which is connected with the rotation axis member to rotate the rotation axis member, and which can be shifted between a first position to hold the latch lever at the engaging position and a second position to hold the latch lever at the disengaging position;

guide means for guiding the latch lever as the tilt lever moves between said first and second positions; and tightening means which presses the fixed bracket against the vertically shiftable bracket to fix the vertically shiftable bracket when the tilt lever is shifted from the second position to the first position and the rotation axis member is rotated according thereto, and which loosens the vertically shiftable bracket from the fixed bracket when the tilt lever is shifted from the first position to the second position and the rotation axis member is rotated according thereto.

8. A tilt steering system according to claim 7, wherein said first set of teeth is formed on the fixed bracket along a circular arc whose center coincides with the first axis.

9. A tilt steering system according to claim 8, further comprising:

biasing means for biasing the tilt lever toward the first position.

10. A tilt steering system according to claim 8, wherein the vertically shiftable bracket has notches which are open at a rear side thereof and through which the rotation axis member penetrates, and a notch which is open at a front side is formed in an end of the latch lever through which the second axis penetrates.

11. A tilt steering system according to claim 7, wherein said guide means includes a disengagement cam face formed on the tilt lever and a cooperable cam pin formed on the latch lever such that when the tilt lever is shifted from the first position to the second position, the cam pin engages the disengagement cam face to urge the latch lever from the engaged position toward the disengaged position.

12. A tilt steering system according to claim 11, wherein said guide means further includes a disengagement cam face formed on the tilt lever such that the disengagement cam face engages the cam pin to urge the latch lever from the engaged position toward the disengaged position when the tilt lever is shifted from the first position to the second position.

13. A tilt steering system according to claim 7, wherein said guide means includes an engagement cam face formed on the latch lever and a cooperable cam pin which is formed on the tilt lever to urge the latch lever toward the engaged position to press the second set of teeth into engagement with the first set of teeth when the tilt lever is shifted from the second position to the first position.

14. A tilt steering system according to claim 7, wherein said guide means includes a cam slot formed in one of the tilt lever and the latch lever and a cam pin formed on the other of the tilt lever and the latch lever, the cam slot having a cam surface which cooperates with the cam pin to urge the latch lever from the engaged position toward the disengaged position when the tilt lever is shifted from the first position to the second position.

15. A tilt steering system according to claim 14, wherein said cam slot includes another cam surface which cooperates with the cam pin to urge the latch member toward the engaged position to press the second set of teeth into engagement with the first set of teeth when the tilt lever is shifted from the second position to the first position.

* * * * *